Aug. 25, 1942.    J. WOERMANN    2,294,219
PROJECTION DEVICE
Filed Jan. 13, 1940    9 Sheets-Sheet 1

INVENTOR
Jacob Woermann
BY J. A. Grier
ATTORNEY

Aug. 25, 1942.   J. WOERMANN   2,294,219
PROJECTION DEVICE
Filed Jan. 13, 1940   9 Sheets-Sheet 3

Fig. 3.

INVENTOR
Jacob Woermann
BY J. A. Grier
ATTORNEY

Aug. 25, 1942.   J. WOERMANN   2,294,219
PROJECTION DEVICE
Filed Jan. 13, 1940   9 Sheets-Sheet 4

INVENTOR
Jacob Woermann
BY J. A. Grier
ATTORNEY

Aug. 25, 1942. J. WOERMANN 2,294,219
PROJECTION DEVICE
Filed Jan. 13, 1940 9 Sheets-Sheet 5

Fig. 5.

INVENTOR
Jacob Woermann
BY
ATTORNEY

Aug. 25, 1942.  J. WOERMANN  2,294,219
PROJECTION DEVICE
Filed Jan. 13, 1940  9 Sheets-Sheet 7

INVENTOR
Jacob Woermann
BY
ATTORNEY

Patented Aug. 25, 1942

2,294,219

UNITED STATES PATENT OFFICE 2,294,219

PROJECTION DEVICE

Jacob Woermann, Glendale, N. Y.

Application January 13, 1940, Serial No. 313,689

23 Claims. (Cl. 88—28)

This invention relates to improvements in projection devices and has for a main object the provision of a projector adapted to automatically project a series of still pictures and including a compartment for a plurality of slides and mechanism for delivering a succeeding slide to and for receiving the preceding slide from the projection stage.

Another object of the invention is the provision in a projector, including a lamp house and a compartment containing transparencies to be projected, of cooling means for both said lamp house and said compartment. This is particularly important when the transparencies are pictures taken in natural colors.

A further object of the invention is the provision in a projector of, an inclined track capable of carrying a plurality of individual slide carriers, a second inclined track capable of carrying a plurality of individual slide carriers, means to successively deliver slides to one of said tracks after they are projected, means to successively deliver slides to a projection stage from the other of said tracks, and the further provision of means to deliver or transfer slides from one of said tracks to the other.

Yet another object of the invention is the provision in a projector, of an "iris" type of shutter having associated therewith mechanism for imparting thereto, in effect at least a toggle action for causing the shutter to close and/or open quickly, said shutter being adapted to cut off the light while one slide is being removed from the projection stage and a succeeding one is advanced to the projection stage.

Another object of the invention is the provision of a projector for a series of still pictures including mechanism for automatically delivering said pictures to and conveying them from the gate in said projector, including a motor for driving said mechanism, including fan means driven by said motor for cooling said projector, and the provision of means for disassociating said motor from said mechanism when it is desired to "dwell" upon any desired picture upon the projection screen, without stopping the action of said fan means.

Another object of the invention is the provision of a projector employing a series of individual slides, the provision of individual holders for said slides adapted to traverse passages and channels in said projector with a minimum of friction and the further provision of novel means for accurately and rigidly registering each slide with the optical axis of the projector immediately prior to its projection onto a projection surface.

Other objects are directed to features of the individual slide holders, the maintenance of positive control of each slide at all times, conjointly acting mechanism for delivering a slide to one end of a pre-projection rail system in the machine while and as a slide from the other end thereof is removed and elevated to the projection stage, many novel and simple mechanical motions, and features and advantages which will be apparent to those skilled in the art, as they are disclosed during the course of the following specification.

The drawings illustrate by way of example one embodiment of my new and improved projector in which.

Figure 1:
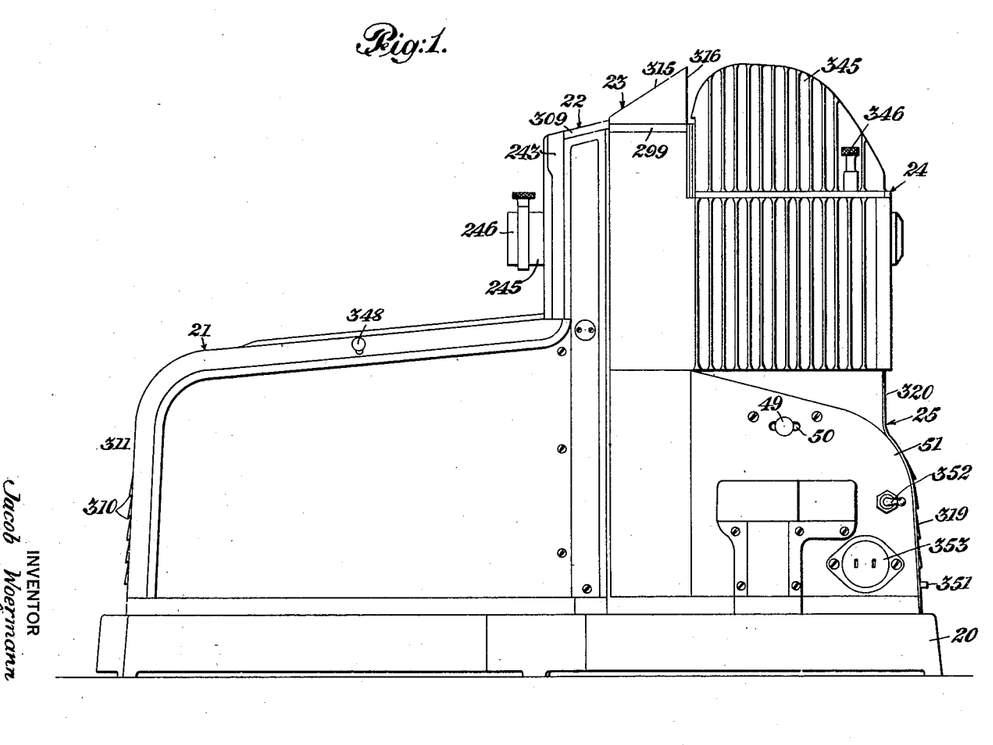
Figure 1 is a right side elevation of the new and improved projector.
Figure 2:
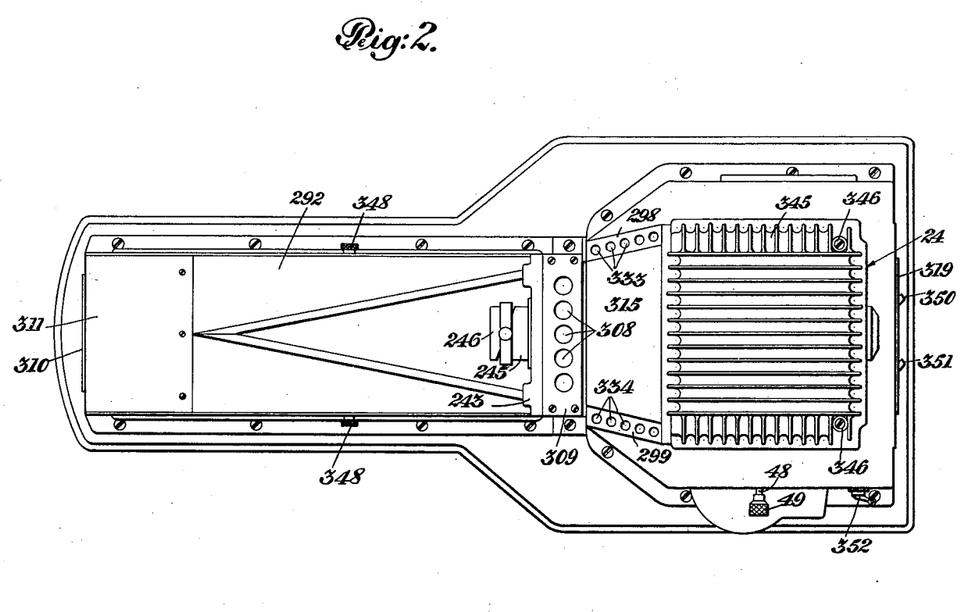
Figure 2 is a view of the projector from above.

Referring to Figure 1, the projector is provided with a base 20 which forms a support for the elements of the projector and which houses some of the driving mechanism to be presently described in connection with Figure 3.

A magazine 21 is provided for the slides. Next to the magazine is a vertical chamber 22 including the projection stage and mechanism to deliver slides to and to remove slides from the projection stage. To the rear of the chamber 22 is a compartment 23 which houses the shutter and the condensing lens cell.

To the rear of the compartment 23 is the lamp house 24 which houses the projection lamp and the reflector. Beneath the lamp house 24 is a housing 25 which includes compartments for the motor, the blower system for cooling the projector, and gearing connecting the motor to the mechanism.

Main drive mechanism

Figure 3:
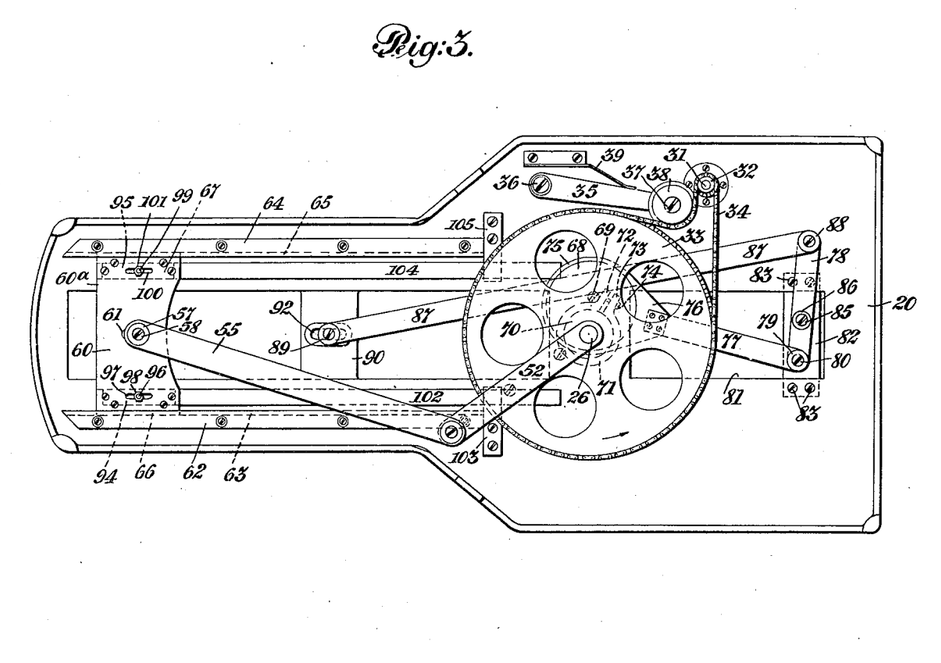
Figure 3 is a bottom view of the projector showing some of the mechanism.
Figure 5:
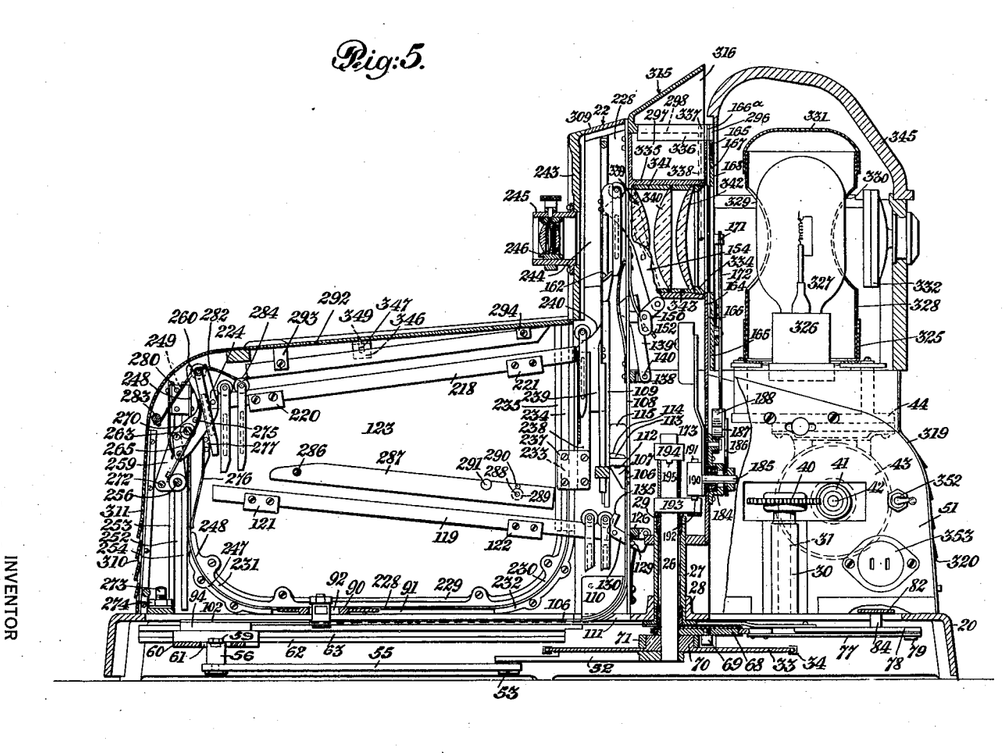
Figure 5 is end view of the slide magazine from the front end of the device, with the covers removed.

Referring now to Figures 3 and 5, the main shaft 26 is vertically disposed and is suitably journaled in a boss 27 supported in the base 20, by means of bushings 28 and 29. A bushing 30 secured to the base 20 forms a bearing for a second vertical shaft 31, which carries on its lower end, a small sprocket 32. The shaft 26 carries on its lower end a large sprocket 33, and a chain 34 about these sprockets forms a reduction drive therebetween. An arm 35 has one end pivotally supported on the base 20 by means of a shouldered screw 36, and a second shouldered screw 37 secured to the other end of the arm 35 forms a pivotal support for the roller 38 which keeps the chain tight. A spring 39 acting against the arm 35 maintains the roller 38 into firm, yet resilient contact with the chain 34.

The upper end of the shaft 31 has secured thereto a worm gear 40 which meshes with a worm 41 carried on the shaft 42 of the motor 43.

Figure 10:
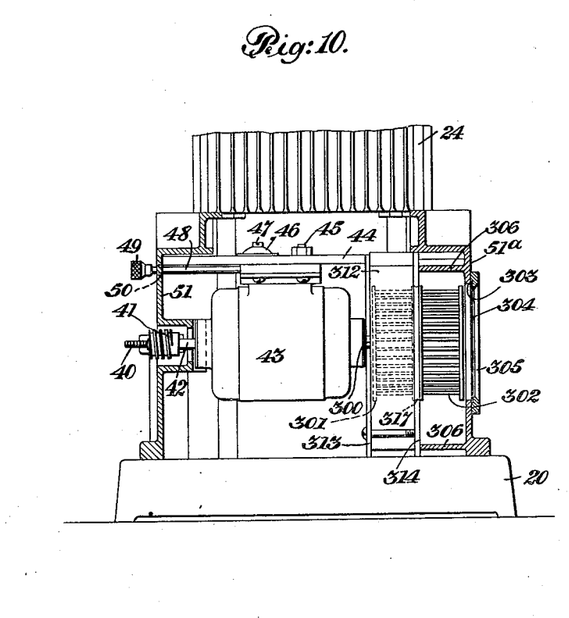
Figure 10 is a view showing the motor pivotally mounted in the frame and carrying the cooling means on one shaft extension, and a worm on the other shaft extension.
Figure 11:
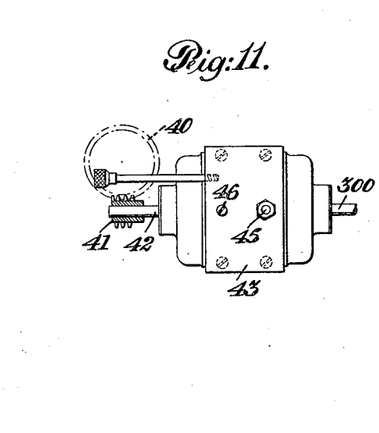
Figure 11 is a view showing how the motor may be shifted on its pivot to disengage the worm from the worm gear when it is desired to project a picture for a period longer than the normal picture projection period of the projector.

The motor 43, as may be seen in Figures 10 and 11, is pivotally mounted on a cross member 44, the bolt 45 forming a pivot pin, and the motor is retained in any set position by a spring cupped washer 47. A suitable slot (not shown) in the cross member provides clearance for a bolt 46 passing through the motor base and said washer.

A stud rod 48 is screwed into the motor base and carries on its outer end, a knurled handle or knob 49. The rod 48 passes through a clearance slot 50 formed in the casing 51 (which is one wall of the housing 25). The slide changing mechanism of the machine may be stopped at will by grasping the knob 49 and swinging the motor on the pivot pin 45 until the worm 41 is disengaged from the worm gear 40 without interfering with the cooling system, to be presently described.

Due to the worm and worm gear, and the small and the large sprockets the speed of the shaft 26 is quite slow.

The sprocket 33 has secured thereto a crank arm 52 which carries on its outer end a shouldered bushing 53 which is secured thereto by a screw 54. A connecting rod 55 has one end forming a bearing on the bushing 53 and its other end pivotally connected to the shoulder of a shouldered stud 56 and retained thereon by a washer 57 and a screw 58. The stud 56 is secured to a cross-head 60 by means of a screw 59 passing through a slot 61 therein. The path through which the cross-head 60 travels may be adjusted by loosening screw 59 and changing the position of the stud 56 relative to the edge 60a of the cross-head and tightening the screw 59 to retain a wanted setting.

A bar 62 having a longitudinal groove 63 formed therein and a bar 64 having a groove 65 formed therein are spaced apart from each other and form parallel slides for the cross-head. A tongue member 66 on the cross-head is slidably positioned in the groove 63 and a tongue 67 is slidably mounted in the groove 65; so that, as the shaft 26 rotates, the cross-head 60 will reciprocate along a path defined by the grooves 63 and 65. The cross-head 60 has mechanism connected thereto for delivering slides to the projection stage which will presently be described.

The main shaft 26 also carries an eccentric 68 having a stud 69 secured thereto. The hub 70 of the sprocket 33 is embraced by a split collar 71 having clamping lugs 72 and 73 and a locking screw 74 therewith, so that after being set at a wanted timing the lug 72 bearing against the stud 69, drives the eccentric 68 when the sprocket is moved in the direction of the arrow.

A circular strap member 75 embraces the eccentric, and may preferably tongue into the periphery of the eccentric. A flat portion 76 of the strap member has secured thereto, one end of a connecting rod 77 which has its other end pivotally connected to a bar 78 by means of a shouldered bushing 79 secured to the bar by a screw 80. A rectangular hole 81 in base 20 is spanned by a plate 82, and screws 83 secure the plate to the base. Mounted on the plate is a shouldered stud 84 having a reduced portion passing through a hole in bar 78 and a screw 85 and washer 86 for retaining the bar 78 thereon.

A connecting rod 87 has one end pivotally connected to the bar 78, which constitutes a walking beam, by means 88 which may duplicate the means connecting the rod 77 to the bar 78 described above. The other end of the connecting rod 87 is connected to a shouldered stud 89 which is carried by a second cross-head member 90 which reciprocates in slides one of which is shown at 91 in Figure 5. A slot 92 in cross-head 90 permits the stud 89 to be adjusted and a nut 93 and a washer are for locking the stud when properly set. Mechanism connected to the cross-head 90 controls the movement of the slides within the magazine and will be described along with the magazine.

Projection stage and the movement of slides thereto and therefrom

Referring to Figures 3 and 5, the cross-head 60 has secured thereto, beneath the tongue members 66 and 67, metallic blocks 94 and 95 respectively. The block 94 carries a stud 96 passing through a longitudinal slot 97, permitting the block to be adjusted relative to the cross-head. A nut 98 having a washer thereunder may be tightened to retain a desired adjustment. The block 95 has a stud 99 passing through slot 100 and provided with a retaining nut 101 for retaining block 95 in a wanted setting.

Secured to the block 94 is a backing strip 102 which is also engaged by a notched bar 103, secured to the base 20 at the end of the bar 62. The notch in bar 103 forms a guide slot for the backing strip 102 as the cross-head reciprocates. A second backing strip 104 is secured to the block 95 and is engaged and guided by a notched bar 105.

A steel ribbon 106 has one end connected to the block 94 and the other end connected to the elevating block 107. The wall 108 and the wall 109 in the chamber 22 are spaced apart from the wall 109 and define a vertical path along which the elevating block 107 travels. Rods 226 secured to the plate 109 and mounted in cross-member 227 secured to the frame 228 aid in supporting the wall 109. Since the cross-head 60 and the block 94 secured thereto move in a horizontal path, the steel ribbon 106 is guided from a horizontal path to a vertical path by the arcuate face of a fan-shaped member 110, the arc of which contacts the steel ribbon 106 and spans an angle of 90°. A guide strip 111 has a beveled face spaced apart from the arcuate face sufficient to clear the steel ribbon and to permit it to move freely over the arcuate face.

The elevating block 107 has a wide portion integral therewith, the lower face 112 of which acts as a cam and the upper face 113 of which also acts as a cam, as will hereinafter be described. Midway the wide portion is a tongue or rib 114 which is engaged by the grooved roller 116 of the slide carriers 118. The elevating block 107 also has secured thereto a bar 115 which functions as a guide bar therefor.

Secured to the block 95 is a steel ribbon 136 similar to 106 and this steel ribbon has associated therewith a second elevating block 117 with lower and upper cam faces 142 and 143, and a rib 144 for engaging grooved rollers 146 on the slide holders. By loosening the nut 98, the block 94, the backing strip 102 and the steel ribbon 106 may be moved relative to the cross-head 60, and thereby the timing and/or height of the elevating block 107 may be adjusted; after which the nut 98 may be tightened to retain such adjustment. Likewise the nut 101 may be loosened, permitting the adjustment of the other elevating block 117 associated therewith; the latter being moved to the point where a slide holder resting on both elevating blocks is level, showing that both blocks are in parallel relation, after which the nut 101 may be tightened to keep this adjustment.

Rails 119 and 120 (Figure 6) are inclined or slant downwardly to paths of travel of the elevating blocks 107 and 117. These rails are parallel and their lower ends terminate below and in line with the wall 109. Rail 119 may be seen in the sectional elevation Figure 5 and also in Figure 9. The rail 119 is supported by members 121 and 122 carried on the side wall 123 of the magazine 21, and the rail 120 is supported by members one of which is designated by the numeral 124 carried on the side 125.

Figure 8:
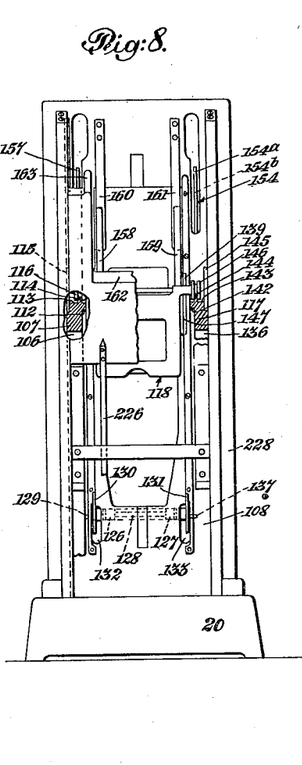
Figure 8 is an elevation of the projection stage and including mechanism and guides for elevating slides to the projection stage and removing projected slides therefrom.

Lugs 126 and 127 on the wall 108 support a shaft 128 which has pivotally supported thereon, on one end thereof, a lever 130; and on the other end thereof, a lever 131 (Figure 8). These levers extend through the wall 108 through perforations 132 and 133 respectively. The lever 130, which may also be seen in Figures 5 and 9 carries a laterally projecting pin 129, which is engaged by a spring 134 secured to the wall 108. Normally the pin 129, under the urge of spring 134, rests against the wall 108 and the tail 135 of the lever 130 is in the position shown in Figures 5 and 9 and acts as a baffle to prevent the slide holders from entering the space between the walls 108 and 109. The lever 131 carries a laterally projecting pin 137 which is also engaged by a spring similar to the spring 134 and normally holds the lever 131 parallel to the lever 130.

When the motor is running the cross-head 60 reciprocates as described and the elevating blocks 107 and 117 are moved up and down in the vertical path between the walls 108 and 109, the lowest point of travel being the position where the upper surfaces 113 and 143 are slightly below the upper surfaces of the rails 119 and 120. The highest point of travel will presently be described.

Figure 9:
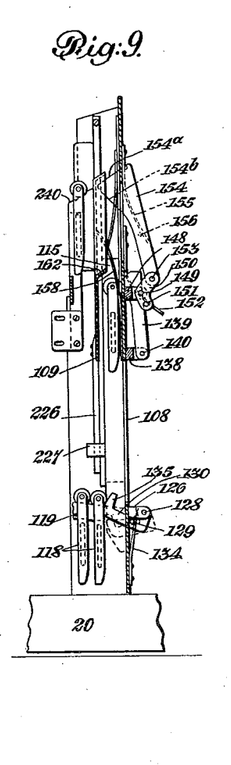
Figure 9 is a side view of the mechanism shown in Figure 8.

As the elevating blocks 107 and 117 approach the lowest point of travel, their lower camming surfaces 112 and 142 respectively engage the tails of the levers 130 and 131; after which further movement to the lowest point of travel causes each of the levers to assume the position shown in dotted lines in Figure 9. Now since the levers no longer form a barrier for the slide carriers on the rails 119 and 120, and since the surfaces 113 and 143 are lower than the lower ends of these slanting rails the end slide carrier is free to roll onto the elevating blocks where the tongues 114 and 144 respectively are engaged by the grooves in rollers 116 and 146 on the slide carrier. The elevating blocks start rising and, during the first portion of their upward movement, the levers 130 and 131 follow said blocks until the pins 129 and 137 contact the wall 108 and cause the levers to come to rest in their normal positions forming baffles for the remaining slide carriers on the rails 119 and 120.

As can be seen in Figure 5, as the slide carrier (and the elevating blocks moving the same) move upwardly, they will encounter, and cause to move laterally, a pair of trip levers provided for causing the preceding slide carrier to be ejected from the projection stage so that the succeeding one (then being elevated) can enter the projection stage when the elevating blocks have raised it to the highest point of their movement as will hereinafter be described.

The trip levers are identical and one of them 139 may be seen in Figure 5 and also in Figure 9. A pair of bosses one of which is designated by the numeral 138 are carried on the rear wall 108 and form supports for a shaft 140 which pivotally supports the trip levers. The camming surface 141 of the trip levers projects through openings in the wall 109, one of which is designated by the numeral 147, see Figure 8. The trip levers it will be noted, are in line with the hubs of the rollers on the slide carriers, therefore the trip levers are actuated only when a slide is being elevated. This makes sure that a slide carrier at the projection stage will not be displaced until a succeeding slide is on the way up to replace it.

A second pair of bosses 148 on the rear of wall 108 are spaced apart from the bosses 138, and support a shaft 149 forming a pivotal support for bell-cranks 150. The bell-crank 150 carries on one arm thereof a stud 151 which normally rests against the back face of the trip lever 139 under the urge of spring means 152 secured to the wall 108. The other arm of the bell-crank 150 carries a stud shaft 153 which pivotally supports a lever 154, the upper end 154a of which functions to position the slide carriers in the projection stage when the bell-crank is in its normal position, and to eject slide carriers from the projection stage when the bell-crank is displaced from its normal position, at the time the levers are cammed by the elevation of a succeeding slide for projection.

The lever 154 carries a stud 155 which is engaged by a spring 156 secured to the wall 108 which urges the lever 154 in a counter-clockwise direction as viewed in Figure 9, and causes the lower corner (bounded by the face 154a) to contact the rear—or right hand—face of the plate 109. The lever 154 has a duplicate in the lever 157 shown in Figure 8, and this lever 157 is mounted on a bell-crank and acts in time with and duplicates the functions described for the lever 154.

Springs 158 and 159 are for engaging the slide carriers and firmly holding the carrier in the projection stage. These springs are secured to the wall 108 near the bosses 138 and extend upwardly, therefore the slide carriers being elevated to the projection stage encounter and are engaged by these springs before they encounter the trip levers 139 described above. These springs extend to points approximately on a horizontal mid-line of the projection stage, and their upper ends are adapted to overlie the ends respectively of downwardy projecting springs 160 and 161 which are secured to the plate or wall 108 near its upper end.

As the slide carrier is being elevated to the projection stage it is, as stated above, engaged by the springs 158 and 159 before it encounters the trip levers. After leaving the trip levers it causes the springs 158 and 159 to move to the right (Figure 9) and to engage the springs 160 and 161, and as it advances further the grooves in the rollers of the slide carrier engage the camming surfaces 154b of the lever 154 and a corresponding camming surface on the lever 157, thereby causing the levers 154 and 157 to move to the right as viewed in Figure 9. As the upward movement of the elevating blocks continues to the upper limit of its stroke, the face 154a and the corresponding face on lever 157 ride below the hubs of the rollers on the slide carrier, and the combined urge of springs 158, 160 and 159, 161 firmly hold the lower face of the slide carrier against the lower edge of the picture gate 162 and the faces of the slide carrier against the upwardly projecting members of the picture gate, one of said members being shown in Figure 8 and designated by the numeral 163, and thereby the slide carrier is firmly held in the projection stage. The elevating blocks then start their movement downwardly to start elevating a succeeding slide carrier.

*The shutter*

Just prior to the point where a succeeding slide carrier being elevated reaches the trip levers, a shutter closes and cuts the light off so that no movement of the slide from the projection stage may be seen on the screen, and opens just after the succeeding slide is positioned in the projection stage and the elevating blocks start down.

Figure 12:
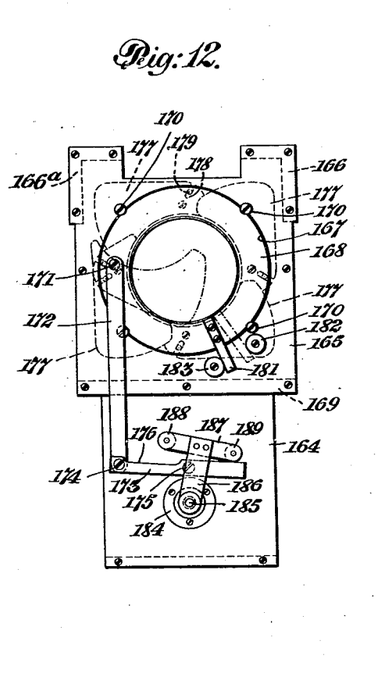
Figure 12 is an elevation of the shutter plate.

The shutter may be seen in Figures 5, 11 and 12, is supported by the wall 164 and by a plate 165 spaced apart from the wall 164 by spacers 166, 166a, and 169. The plate 165 has a bored hole 167 therein and an annular ring 168 forms a working fit in the hole 167. The ring 168 is retained in position in the hole by means of screens 170 in the plate 165 and having heads overlying the ring 168.

A shouldered screw 171 in the ring 168 has pivotally connected to it a connecting bar 172 which is pivotally connected to a lever 173 by means of a shouldered screw 174. The lever 173 is pivotally mounted on the plate 165 by means of a shouldered screw 175. The lever 173 also has a portion cut away at 176 for clearance.

The shutter is of the usual "iris" type and includes a plurality of blades 177 pivoted on pivot screws 180, mounted in wall 164 and having slots 178 formed therein engaged by pins 179 carried by the ring 168. A stop lever 181 is secured to the ring 168 extends radially therefrom to be engaged by a bumper 182 when the shutter is closed, and by a bumper 183 when the shutter is open.

Figure 13:
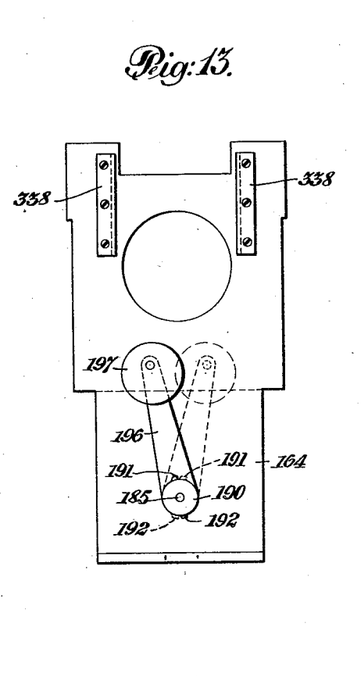
Figure 13 is an elevation of the shutter plate as viewed from the side opposite to that shown in Figure 12.

A flanged bushing 184 is secured to the wall 164 and has a bearing hole extending therethrough and contains a ball bearing for a shaft 185. A lever 186 has a bossed end keyed to the shaft 185 and has riveted or otherwise secured to its other end, a cross-arm 187. Bumpers 188 and 189 are carried by the cross-arm.

The shaft 185 has keyed thereto a collar 190 carrying oppositely disposed engaging members 191 and 192. The main shaft 26 carries cams 193 and 194 in spaced relation to each other and having sidewardly projecting extensions, one of which is designated by the numeral 195, adapted to engage the engaging members 191 and 192. The cam 194 engages the member 191 and causes the shutter to close by causing the collar to rotate through a small arc in a clockwise direction as viewed in Figure 13. The collar 190 may be a bossed hub in some forms of the device and may have secured thereto a lever 196 carrying a weight 197, the weight being eccentrically mounted on the lever and adapted to be rotated for adjustment. As the collar rotates through said arc in clockwise direction, the lever 196 together with the weight 197 also moves counterclockwise and as soon as the center of mass of the weight passes the vertical axis, gravity action on the weight causes the lever 196 to rapidly swing over to the position shown in dotted lines in Figure 13 and thereby causing the shutter to close rapidly. The bumper 188 acts against the lever 173, pulls the connecting bar 171 downwardly as seen in Figure 12, rotates the ring 168 in a counter-clockwise direction and moves the lever 181 to the position indicated by dotted lines to be stopped by the bumper 182.

The main shaft 26 rotates in one direction only, so, due to the fact that the cam 194 engaged the member 191 from above, the opposite effect may be had by having the cam 193 act upon the member 192 from below. This causes the connecting rod 172 to move the ring 168 (as viewed in Figure 12) in a clockwise direction, thereby rapidly opening the shutter under the direct control of gravity when the lever 196 passes the vertical center line while moving to the left, as viewed in Figure 13. As described above, the shutter is opened just before a succeeding slide while being elevated to the projection stage encounters the trip levers 139 because they cause the slide at the picture gate to be ejected to make room for the succeeding slide. The shutter closing prevents this from being seen on the screen. The shutter then reopens just after the elevating blocks have started back down after the delivery of said succeeding slide to the picture gate. It will be noted that the shutter is positioned between the source of illumination and the condensing lens system. This is of distinct advantage, as it abets the cooling of the colored pictures carried in the slide carriers in the machine. The cooling system will be described in detail presently.

*Slide carriers*

Figure 14:
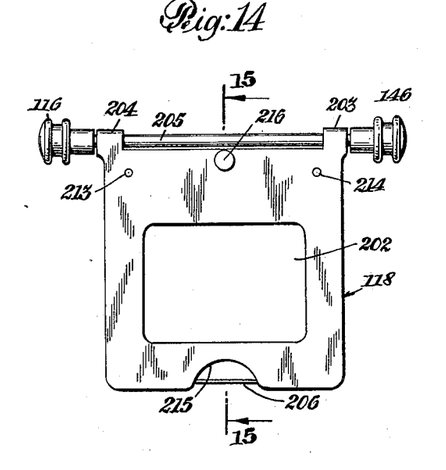
Figure 14 is a front elevation of my new and improved slide carrier.
Figure 15:
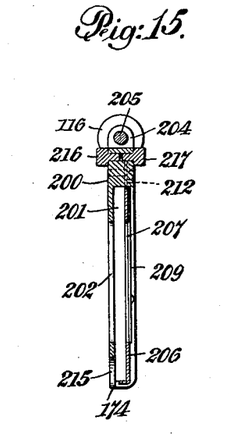
Figure 15 is a sectional elevation taken along the line 15—15 of Figure 14.
Figures 16, 17:
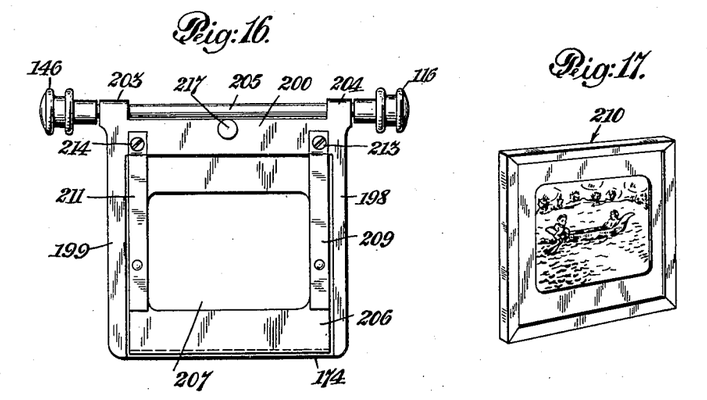
Figure 16 is a rear view of the slide holder shown in Figure 14.
Figure 17 is a perspective view showing a slide adapted to fit the slide holder, Figures 14 to 16 inclusive.

The slide carrier is shown in detail in Figures 14, 15, and 16, and is generally designated by the numeral 118 in Figures 6 to 9 inclusive. The slide holder includes a body 174, which is preferably a casting, having side border portions 198 and 199 and a top border portion 200 which define a recess 201 therein to contain a slide, such as that designated by the numeral 210 in Figure 17. The rear wall of the body 174 has a frame opening 202 formed therein. Preferably formed integral with the body 174 at the tip are bosses 203 and 204 which are drilled to form bearings for a shaft 205 carrying the grooved rollers 116 and 146.

A plate 206 has a frame opening 207 formed therein and has its lower edge 208 bent at right angles to engage the lower edge of the slide. Springs 209 and 211 are secured to the plate 206, preferably along a line below the center line of the frame opening 207 and extend to points in line with the bottom edge of the frame opening 207. The upper ends of these springs extend beyond the top of the plate 206 and fit in recesses, one of which is designated by the numeral 212 in Figure 15. The springs are secured in these recesses by means of screws 213 and 214. The body 174 has a curved opening 215 in its lower edge forming a "thumb hole" to facilitate the removal of slides from the carriers.

In placing a slide in or removing one from a carrier the operation is facilitated by lifting the lower edge of the plate 216 (Figure 16) and slipping a wire or small rod across the side borders 198 and 199, then let the plate come in contact with the wire or rod so that the latter holds the plate out of the way. This permits the removal or insertion of a slide to be freely effected, after which the wire may be removed, to release the plate.

Each slide carrier is provided with spacer buttons 216 and 217 which contact spacer buttons on adjacent slides and prevent the rollers from contacting each other and running askew.

*Slide holder magazine and the movement of slides therein*

The magazine 21 is provided for holding the slide carriers. How the slide carriers are fed from the magazine to the elevating blocks has already been described in connection with the description of the projection stage and the movement of slides thereto and therefrom. Due to the fact that the elevating blocks are successively removing slide carriers from the inclined rails 119 and 120, the supply of carriers on these rails must be replenished. In my new and improved projector I deliver a slide carrier to the rails 119 and 120 during each projection cycle of the machine.

The magazine is provided with another pair of rails 218 and 219, located above the rails 119 and 120 a sufficient distance to provide clearance between the slide carriers on rails 218 and 219 and the rails 119 and 120. The rails 218 and 219 are inclined in a direction opposite the inclination of rails 119 and 120. The rail 218 is supported by blocks 220 and 221 carried on the wall 123, and likewise the rail 219 is supported by blocks 222 and 223 carried on the wall 125. The rail 218 carries on its lower end, a stop 224, and the rail 219 carries a corresponding stop 225.

Referring now to Figure 3, the cross-head 90 has been described together with the linkages between it and the eccentric 68 for reciprocating it in the frame. Referring now to Figure 5, the cross-head 69 has secured thereto a steel ribbon 228. A guide member 229 having curved ends 230 and 231 is mounted on the side wall 123. Slightly spaced apart from the curved end 230 is a curved guide member 232, and the steel ribbon extends through the space between 230 and 232, and is connected to a slide block 233 which slides along a vertical path 234 defined by spaced vertical bars 235 and 236. A plate 237 is secured to the slide block 233 and in turn a bar 238 is secured to the plate 237 and carries a block member 239 having a convexed upper end 240 and forming a slide elevator for lowering the ejected slides from the projecting stage to the rails 218 and 219. The slide elevator 239, 240 and the parts described connecting it to the cross-head 90 are in line with the rail 218. A second set of duplicate parts is also associated with the cross-head 90 and are in line with the rail 219. These parts are not shown, except in Figure 6, the block member 239a corresponds to 239, the bar 238a corresponds to 238 and the convex upper end 240a corresponds to 240. A plate 241 forms a connecting web between the bars 238 and 238a, and is secured thereto by means of screws 242.

How a succeeding slide carrier being elevated to the projection stage engages the trip levers 139 and ejects the slide carrier then at the projection stage has already been described. A plate 243 is secured to the frame 228 and is spaced apart from the picture gate 162, thereby providing a space 244 in which the elevator 240, 240a travels, and for also guiding the ejected slide carriers to the elevator. As the cross-head moves to the left, as viewed in Figure 5, the ejected slide is lowered to the lowermost position illustrated in said figure. The slide carrier has just cleared the lower end of the plate 243 and is free to roll off onto the rails 218 and 219 and thence down the incline to the other slides as shown. The slide carrier on the left end is stopped by the stops 224 and 225. The plate has clearance slots on the back to clear the rollers on the slide carriers, and has secured thereto a focussing lens mount 245 carrying an objective lens cell 246.

Figure 6:
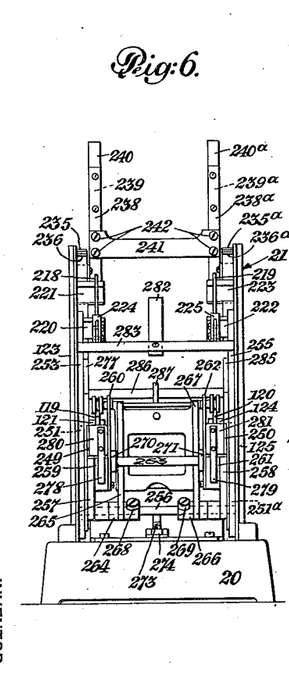
Figure 7:
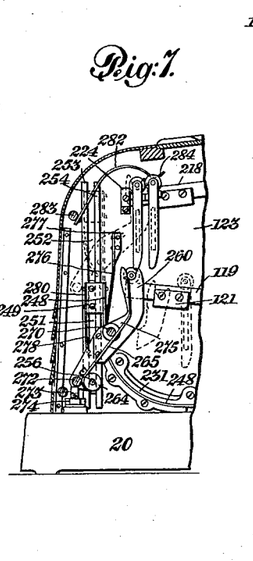
Figure 7 is a side view of a portion of the magazine shown in Figure 6.

The curved end 231 of the guide member 229 has slightly spaced apart therefrom a curved member 247, and a steel ribbon 248 mounted in the space between and guided by members 247 and 231 has one end thereof secured to the cross-head 90 and the other end secured to an angular plate 249, and a corresponding steel ribbon guided in the same manner by guide members on plate or wall 125 has one end connected to the cross-head 90 and the other end connected to an angular plate 250 (Figure 6). A slide block 251 is connected to the angular plate 249 and is reciprocated vertically in the space 252 between the vertical path one boundary of which is the bar 255 secured to wall 125 of the magazine. A rod 256 secured to the slide block 251 and its duplicate 251a forms a pivotal support for rocker arms 257 and 258. The rocker arm 257 carries a boss 259 which has screwed or otherwise secured thereto a slide holder engaging arm 260. The rocker arm 258 has a boss 261 which has secured thereto an engaging arm 262 which is parallel to engaging arm 260. A tie rod 263 is secured to both said engaging arms, serving as a distance rod, and at the same time to tie the rocker arms and the engaging arms in a rigid structure adapted to be pivotally moved on the rod 256, as will presently be described.

A sleeve 264 forms a support for a spring 265. The spring embraces the sleeve and has a bent end engaging a slot in the sleeve. A second sleeve 266 supports a like spring 267. These springs bear lightly against one side of slide carrier when the same is picked up by U shaped ends of the engaging arms 260 and 262, and at the same time these springs, due to the fact that they bear against the tie-rod 263, urge the structure associated therewith in a counter-clockwise direction as viewed in Figure 7. The sleeves 264 and 266 may be turned on the rod 256 to give the springs the desired pressure against the slide carrier and may respectively be locked by set screws 268 and 269. Washers 270 and 271 on tie rod 262 serve as guides for the springs 265 and 267. A second tie rod 272 connects the rocker arms 257 and 258 together. This rod may be seen in section in Figures 5 and 7 but is omitted from Figure 6 so that the rod 256 and the spring carrying sleeves 264 and 266 can be seen. An adjustable stud 273, adapted to be locked in any setting by lock nut 274, engages the tie rod 272 (see Figure 7) as the structure approaches its lowermost position. After which during the final movement (from the point where the tie rod is engaged, to the lowermost position) the structure also moves in a clockwise direction about the rod 256, thereby lowering a slide carrier thereon to the rails 119 and 120. The springs 265 and 267 pressing against the left side of the slide carrier facilitate the release of the slide carrier hubs from the U shaped ends of the engaging arms (260 and 261).

As the structure starts upwardly, the structure, under the urge of the springs 265 and 267, moves pivotally on rod 256 in a counter-clockwise direction until the stud pin 275 engages the spring 276 and thereafter the stud pin 275 follows the right hand surfaces of the spring (Figure 7) and of the supporting boss 277, thereby causing the U shaped ends of the engaging arms 260 and 262 to be guided directly to the hubs of the left end slide carrier on the rails 218 and 219. When the stud pin 275 reaches the top of the boss 277, the structure swings further in a counter-clockwise direction until the rocker arms 257 and 258 encounter buffer springs 278 and 279 respectively carried on angle members 280 and 281 supported on plates 249 and 250. A spring 282 has an end portion 284 which prevents the end slide carrier from moving out of the range of the engaging arms 260 and 262 when the structure is approaching its uppermost position. When the structure swings clear of the boss 277 and engages the buffer springs, the shaft of the slide carrier engages and raises the end 284 of spring 282, permitting the second slide carrier to move down against the stops 224 and 225 ready to be picked up on the next upward stroke of the structure. The engaging arm 262 also carries a stud pin like 275 and a spring like the spring 276 is provided to cooperate therewith. These are not shown in the drawing, but a supporting boss 285 is shown in Figure 6 and forms a support for such spring.

As the structure starts down again to deliver a slide holder to the lower rails 260 and 262, the stud pin 275 is between the spring 276 and the bar 254 thereby causing the slide carrier to move down in almost a straight line well away from the left ends of the rails 260 and 262, and the stud pin 275 moves clear of the spring 276 before the tie rod 272 encounters the stud 273 and causes the structure to tilt in a clockwise direction as before described, to deliver the slide carrier to said rails. From the above description it can be seen that the structure pivotally carried on rod 256 which is in turn supported on slide blocks 251, 251a moves up and down as the cross-head 90 reciprocates and delivers slide carriers, one at a time, from the upper rails to the lower rails; and at the same time the members 240, 240a also driven by the cross-head 90 deliver the slide carriers one by one from the projection stage to the top rails of the magazine.

A cross rod 286 between the walls 123 and 125 pivotally supports a restraining bar 287 for preventing the slide carriers from "piling up." This bar is engaged by spring loaded balls engaging depressions (one shown at 288) on each side of the bar 287. The balls are carried by stud shafts, one of which is designated by the numeral 289. A stop 290 prevents the bar from engaging too deeply, and a handle bar 291 is provided to facilitate the raising of the bar 287. A cover plate 292 for the magazine carries bosses 293 and 294, which have secured thereto a restraining bar 295 to prevent slide carriers on top rails from "piling up." The cover plate is removably mounted on the magazine so that slide carriers may be added or removed.

The twin cooling system

The motor 43 has a shaft extension 300 which has secured thereto two "Seroco" type blower rotors 301 and 302. The casing wall 51a has a hole 303 formed therein in line with the intakes of the rotors 301 and 302. This hole serves as the inlet port for said rotors, and is covered with a screen 304 which is sandwiched between the wall 51a and an annular ring 305 screwed to said wall. The wall has preferably formed integral therewith a web 306 which forms a housing for the rotor 302, and has an outlet opening 307 for delivering air into the space between the wall 164 and the wall 108 where the condensing lens mount 315 is cooled and its cooling air passes out via holes 333, 334. Some air passes upwardly between walls 108 and 109 where the slide at the picture gate is cooled and also the picture being elevated. Some of the air passes through openings in wall 109 and divides; part of it passing upwardly through the space 244, where it cools the ejected slides, and passes out together with air from the picture gate via holes 308 in closure plate 309; and the remainder passing through the magazine 21 where the slides therein are cooled, and passes out via the louvres 310 formed in the closure wall 311. From the above it will be seen that all of the slides in the machine, whether they are in the magazine, in the picture gate or on the way therefrom or thereto, they are at all times being cooled, therefore it is impossible for the slides to become overheated in my machine. This makes it particularly adapted to handle colored slides, as there is no danger of having the colors impaired by heat.

Figure 4:
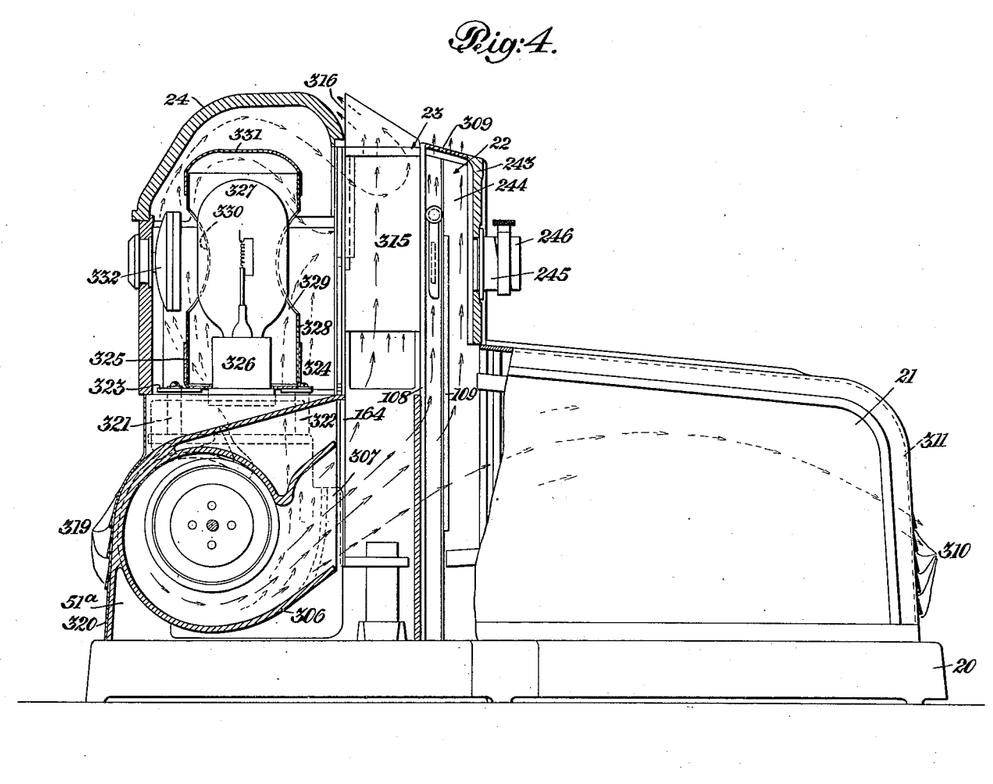
Figure 4 is a left side view of the projector, a portion thereof being in section the mounting of the projection lamp, and showing the paths of the cooling air through the projector and the magazine.

The rotor 301 is embraced by a housing 312 having end walls 313 and 314. The wall 314 has an inlet hole 317 communicating with the opening or hole 303 via the interior of the rotor 302. The housing 312 has a discharge opening 318 which communicates with and delivers almost its full volume of air to the interior of the lamphouse 24 (a small portion of air therefrom being deflected over the motor 43, cools the same and passes out via louvres 319 in the closure plate 320). The cross member 44 supports studs 321 and 322 which have secured thereto lugs 323 and 324 supporting an upturned perforate cup shaped member 325. The lamp socket 326 is secured to the member 325 and contains a lamp 327. A tubular member 328 has front and rear holes 329 and 330 formed therein to let light pass respectively from the lamp to the condensing lens system and from the adjustable reflector 332 to the condensing lens system. A cap closes the upper end of the tubular member 328. Some of the air passes through perforations in the cup 325, and out via openings 329 and 330, air also passes about the tubular member 328 and cap 331. Some air also takes up heat from the reflector and all of the air from the lamp house passes out via the opening 316, thus removing a large quantity of heat from the lamp house and its contents, thereby further facilitating the cooling of the slides. In Figure 4, the cooling air path from the blower 302 is indicated by solid arrows, and the cooling air path from blower 301 is indicated by dotted arrows.

*Other features of the machine*

The condensing lens system formed in a cell generally designated by the numeral 315 hereinbefore referred to is for convenience formed of two castings secured together after they are machined. The top casting has the opening 316 formed therein to permit air to discharge from the lamp house via the opening 296. The parallel side walls 297 of the lower casting isolate the hot lamp house air against entering the space between the walls 164 and 108. The top casting has laterally extending walls 298 and 299, which cover the space on each side of said parallel walls 297, and a series of perforations 333 in wall 298 and a second series of perforations 334 in wall 299 form outlets for air to discharge from the space between walls 164 and 108. The parallel side walls of the lower casting merge with a tubular portion 335. The top casting has downwardly extending portions 336 which are secured to the parallel side walls 297 in any suitable manner to form a unitary structure which may be bodily inserted into or removed from the upper end of the projector. The walls 297 have extending therefrom, webs 337 which engage and are guided by guide strips 338 secured to the face of the plate at wall 164.

The tubular portion 335 has at the front end thereof a plano-convex lens 339, spaced apart from which is a second plano-convex lens 340, a tubular spacer 341 serving as a spacer. Between the lens 340 and a concavo-convex lens 342 is a second tubular spacer 343. A retaining ring 344 is screwed into the tubular portion for retaining the lenses and their spacers in the cell.

The lamp house is provided with a finned cover 345 which is secured on by screws 346 and is readily removable so that the lamp may be replaced or the reflector 332 may be cleaned, etc. In order to replace a lamp, the screws 346 are removed and the cover 345 is removed, after which the tubular member 328 may be disengaged from the cup 325 and removed. Then the lamp 327 may easily be removed and replaced.

The magazine cover 292 carries lugs 346 which in turn carry studs 347 and thumb-nuts 348. When the cover 292 is applied to the magazine, the studs 347 enter slots 349 in the side plates 123 and 125 and permit the cover to go down on the opening in the magazine and cover the same, after which the nuts 348 may be tightened. In opening the magazine to add or remove one or more slide carriers, the thumb nuts 348 are loosened after which the cover 292 may be readily removed.

In the rear wall of the machine are a switch 350 for controlling the flow of current to the lamp 327, and a switch 351 for controlling the motor. Augmenting the latter is a double throw switch 352. A terminal socket plug 353 is provided for connection to a source of current for the device. In some modifications the switch 352 may be omitted, however in the present embodiment, this switch is provided so that when in one position the motor is conditioned to run on direct current and when the switch is in its other position the motor is conditioned to run on alternating current.

The reduction drive between the shaft 31 and the main drive 26 is herein shown as including sprockets 33 and 32 connected by a chain 34. I reserve the right to use other equivalents such as gearing or belts.

Although the embodiment of the invention herein disclosed is given by way of example, it must be understood that I must not be limited to the embodiment shown, as I may make many changes therein in accordance with the scope of the appended claims.

I claim:

1. A projector including a base, a shaft journaled in said base, a motor, transmission means between said motor and said shaft, a cross-head and ways therefor horizontally disposed on said base, other means on said shaft, and having mechanism connected thereto and to said cross-head for reciprocating said cross-head along said ways, other mechanism adapted to be reciprocated in a plane at an angle of 90° with respect to the plane of said base, a thin flexible strip of material linking said cross-head to said other mechanism, and curved guide means contacting at least a substantial portion of the widest surfaces of said strip whereby both the push and the pull of said cross-head as it reciprocates in a plane parallel to said base is transmitted to said other mechanism without lost motion, thereby causing said other mechanism to reciprocate in said plane at an angle of 90° with the plane of said base.

2. In a projector for pictures, a carrier for each of said pictures, each carrier being provided with overhanging supports, a picture gate, a magazine having inclined rails therein engaged by said supports, an elevator moving in a vertical path adjacent to the lower ends of said rails and adapted to successively raise said carriers vertically from the rails in said magazine to said picture gate, a pair of levers spaced apart from each other, and positioned on each side of said picture gate, spring means urging said levers toward said gate, upper and lower camming surfaces on said levers forming "V's" with their apexes contacting said picture gate, whereby the overhanging supports on a slide carrier being elevated first to engage the lower camming surfaces and cause said levers to move out against the urge of the spring means and due to the snapping back of said levers to their normal positions after said supports have passed over said apexes, said supports are secondarily engaged by the upper camming surfaces and thereby said carrier is positioned in registration with said picture gate.

3. In a projector for pictures, a carrier for each of said pictures, each carrier being provided with over-hanging rollers forming supports, a picture gate, a magazine having inclined rails therein engaged by said supports, an elevator moving in a vertical path adjacent to the lower ends of said rails and adapted to successively pick up and raise said carriers vertically from said rails to said picture gate, a pair of upwardly extending spring members spaced apart from each other and engaged by a carrier being elevated before it reaches said gate, a pair of downwardly extending spring members supported above said picture gate in parallel relation to said first spring members and adapted to be engaged in over-lying relation by said first spring members as said elevated carrier is raised into position at said gate, whereby the urge of all said spring members is imposed upon said carrier to hold it in frictional contact with said picture gate.

4. The invention according to claim 2, in which bell cranks pivotally supported in said projector carry pivots supporting said levers, and in which trip levers associated with said bell-cranks are positioned adjacent to the path of said elevator and adapted to be actuated only by the overhanging supports of a slide carrier being elevated, thereby swinging said bell-cranks and causing the said levers pivotally connected thereto to move upwardly longitudinally and eject the previous slide carrier from said picture gate in order to condition said gate to receive the slide carrier being elevated.

5. In a projector, an optical system including an objective lens and a condensing lens, a picture gate therebetween, a source of light, an "iris" shutter positioned between said condensing lens and said source of light, a shaft positioned adjacent to said shutter, actuating means for said shutter carried on said shaft, a second shaft at right angles to said first shaft, a cam on said second shaft positioned above said first shaft, a second cam on said second shaft positioned beneath said first shaft, and means on said first shaft to be engaged by said cams whereby, with said second shaft rotating in one direction only, one of said cams swings said first shaft in one direction to cause said shutter to open, and the other of said cams swings said shaft in the opposite direction to cause said shutter to close.

6. The invention according to claim 5 in which said first shaft has secured thereto a lever extending upwardly and carrying a weight, said lever being so set on said shaft that when the shutter is changing from its open to its closed position and vice versa, the lever crosses the vertical center line and is attracted by gravity and thereby the action of the shutter is accelerated.

7. In a slide carrier, an apertured member adapted to span one entire face of the slide, a second apertured member oppositely disposed and adapted to embrace the opposite face of said slide, spring means associated with both said members for urging them towards each other, a rod supported on said carrier and overhanging the side edges thereof for engagement with means external to said carrier, and rollers secured to the overhanging ends of said rod.

8. In a slide carrier, a rectangular body having a depression formed therein to receive a slide, an aperture formed in the wall of said body communicating with said depression, a pair of aligned lugs carried on said body and having aligned holes formed therein, a shaft journaled in said holes and overhanging the side edges of said body, rollers carried on the overhanging ends of said shaft, an apertured retaining plate for retaining a slide in said depression, and spring means carried on said body and supporting said retaining plate, said spring means serving for maintaining the latter in intimate contact with the slide in said depression.

9. A slide carrier according to claim 8 in which siad rollers are provided with hubs and are keyed onto the ends of said shaft, thereby preventing the roller on one end from turning faster than the roller on the other end and causing the slide to move unequally over surfaces supporting said rollers.

10. A slide carrier according to claim 8 in which said rollers are provided with hubs and are fixed on the ends of the shaft, whereby when said rollers engage rails with said body suspended therebetween, both rollers must turn at the same rate and prevent said carriers from becoming askew, and spaced members carried on both sides of each carrier, so that when a spacer on one carrier engages a spacer on an adjacent carrier, the rollers on the carriers do not touch each other.

11. In a projector for projecting a series of still pictures, a carrier for each of said pictures, a picture gate, a magazine for said carriers and the pictures therein, a pair of rails in said magazine slanting toward one end of said magazine and forming a support for some of said carriers, a second pair of rails in said magazine below said first rails and slanting toward the other end of said magazine to form a support for others of said carriers, a picture gate in said projector positioned above said magazine, an elevator in said magazine operating between said rails at said first end of said magazine for lowering slide carriers one at a time directly from said first rails to said second rails, a second elevator operating to lower slide carriers from said picture gate to the higher ends of said first rails, and means for raising slide carriers from the lower ends of said second rails up to said picture gate.

12. In a device for projecting a series of still pictures, an optical system including a picture gate, a source of light, a plurality of individual carriers for the pictures, a magazine for said carriers positioned below the axis of said optical system and including a pair of inclined rails to which picture carriers leaving said picture gate are added and a second pair of inclined rails from which picture carriers are removed to be projected, said rails being adapted to support groups of said carriers, an elevator within said magazine for lowering carriers from said first pair of rails to said second pair, a second elevator external to said magazine and moving in a path whose lower end terminates at the lower ends of said second rails, said second elevator being adapted to elevate said removed carriers to said picture gate, and a third elevator for lowering carriers from said picture gate and adding them to said first rails as aforesaid.

13. In a picture projector, an optical system including condensing lenses, a picture gate, a source of light, a magazine spaced apart from said light and positioned below the axis of said system for containing a plurality of pictures, mechanism operating in picture cycles to remove from said magazine and deliver succeeding pictures to and to remove preceding pictures from said gate and return them to said magazine, a motor, a cooling system for cooling said source, a second cooling system for cooling said condensing lenses and said pictures in said magazine and at said gate, means permanently connecting both said cooling systems in driven relation to said motor, a driving connection between said mechanism and said motor, and means for disassociating said motor from said mechanism without interfering with the operation of said cooling systems, thereby permitting the projection of any of said pictures for a period longer than the picture cycle of said mechanism.

14. In a projector for slides including a picture gate and having individual carriers each being provided with rollers, elevator means for moving said slide carriers along vertical paths in said projector, and track means in said projector defining upper and lower non-vertical paths along said vertical paths, said picture gate being at a level substantially higher than said upper non-vertical path and said elevator means being adapted to individually raise said slide carriers from said lower path directly up to said picture gate.

15. In a projector for slides, an optical system, a picture gate, a source of light, individual carriers for said slides, a magazine below the axis of said optical system, rails in said magazine defining upper and lower paths for said carriers, elevator means for raising slide carriers from said lower path directly to said picture gate, means controlled by a slide carrier being raised for ejecting the preceding slide carrier from the picture gate before said slide being raised reaches said gate, a second elevator for lowering the ejected slides from said gate to said upper path, and a third elevator for lowering slide carriers from said upper path to said lower path.

16. In an automatic projector for slides, a source of light, a picture gate, a slide carrier for each of said slides, a magazine for said slide carriers positioned below the optical axis of said projector, an upper set of rails and a lower set of rails forming supporting paths for said slide carriers, means operating in a path outside said magazine for individually removing a slide carrier from the lower rails in said magazine and elevating it above the magazine to said picture gate during each projection cycle of the projector, means actuated by the slide carrier being elevated for ejecting the carrier of a previously projected slide from the picture gate before the carrier being elevated reaches said gate, means for individually lowering the ejected slides and delivering them to said upper rails in said magazine, and means operating in definite time relation to said last means for individually transferring slide carriers from said upper rails to said lower rails, all said means operating once during each projection cycle.

17. In combination with a projector, a picture gate, a magazine below said gate and spaced apart therefrom, a pair of parallel rails within said magazine, a second pair of parallel rails within said magazine, a second pair of rails therein and spaced apart from said first rails, a group of slide carriers on said first rails, a second group of slide carriers on said second rails, several means operating in picture cycles of said projector, one of said means being provided for sequentially removing slide carriers from said second or lower rails and raising them outside of said magazine and up to said film gate, a second of said several means being adapted to sequentially lower said slide carriers from said picture gate to said first rails, and a third of said several means being adapted to sequentially lower slide carriers from said first rails to said second rails.

18. In a projector for slides in combination, a magazine, a picture gate above the top plane of said magazine, a plurality of slide carriers for said slides and contained in said magazine, mechanisms for causing said carriers to traverse definite paths through said magazine, an elevator outside of and at one end of said magazine and adapted to receive said carriers singly and successively raise them up above the top plane of said magazine to said gate, a second elevator moving in a path a portion of which is external to said magazine for receiving carrier from said picture gate and lowering the same to an upper of said paths in said magazine, a third elevator between the upper of said paths in the magazine and a lower of said paths therein, and a control member associated with said third elevator for causing the latter to move along one course when traveling upwardly and to move along a different course when traveling downwardly.

19. The invention according to claim 11 in which said first and said second elevators are linked together by a guided flexible strip, one end of said strip being directly connected to said first elevator and the other end being connected to said second elevator, said strip being of such length that when one of said elevators is at the top of its stroke, the other is at the bottom of its stroke, and in which said means for raising includes a driving member connected to an intermediate point of said flexible strip.

20. The invention according to claim 17 in which a bar parallel to and spaced apart from said first rails is supported above an intermediate line between said rails, and in which a second bar parallel to and spaced apart from said second rails is supported above an intermediate line between said second rails, for preventing slide carriers on said rails from piling up and jamming, said bars being adapted to be moved from the positions described to give access to the slide carriers on each of said rails.

21. A projector according to claim 18, in which said third elevator includes a tiltable member carrying engaging arms spaced apart from each other and having U shaped notches formed therein for engaging and supporting a slide carrier while said third elevator is lowering the same toward the lower of said paths, and a settable stop adapted to cause said tiltable member to tilt to a position where said slide carrier passes from said notches to the lower path.

22. In a projector for slides, a frame, a magazine for said slides, a reciprocative member operating in a vertical plane for individually engaging and moving said slides, a second reciprocative member on said frame operating in a horizontal plane, means on said frame for driving the second of said reciprocative members in said horizontal plane, a thin metallic ribbon extending from one of said planes to the other and connected to said members, and guide means contacting said ribbon and including a curved portion extending from one of said planes to the other and tangent to both said planes, whereby the motion of said reciprocative member being driven in said first plane without lost motion.

23. In a projector for projecting a series of still pictures, a carrier for each of said pictures, each carrier having overhanging supports, a picture gate, an elevator adapted to move from said picture gate in a vertical path extending downwardly to a receiving station below said gate, a pair of rails inclined toward said station and engaged by said supports whereby said carriers are moved toward said station by gravity, a pivoted member at said station normally forming a barrier to prevent the slide carrier on the lower ends of said rails from entering said path, and means carried by said elevator for engaging and pivotally displacing said barrier when said elevator reaches its lowermost position at said station, thereby permitting said end slide carrier only to move onto said elevator by gravity.

JACOB WOERMANN.